United States Patent
Koo et al.

(10) Patent No.: US 12,314,812 B2
(45) Date of Patent: May 27, 2025

(54) TWO-DIMENSIONAL CODE ARRANGEMENT, POSITION DETERMINATION DEVICE, AND METHOD FOR POSITION DETERMINATION

(71) Applicant: Robert Bosch GmbH, Stuttgart (DE)

(72) Inventors: Chee Hung Koo, Munich (DE); David Kampert, Aichwald (DE); Joachim Frangen, Heilbronn (DE); Marian Marcel Vorderer, Rutesheim (DE); Sebastian Schroeck, Weil der Stadt (DE); Thomas Betzitza, Calw (DE); Urs Leberle, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/566,720

(22) PCT Filed: May 12, 2022

(86) PCT No.: PCT/EP2022/062911
§ 371 (c)(1),
(2) Date: Dec. 4, 2023

(87) PCT Pub. No.: WO2022/258295
PCT Pub. Date: Dec. 15, 2022

(65) Prior Publication Data
US 2024/0202477 A1     Jun. 20, 2024

(30) Foreign Application Priority Data

Jun. 10, 2021  (DE) .................. 10 2021 205 874.4

(51) Int. Cl.
*G06K 7/14* (2006.01)

(52) U.S. Cl.
CPC ......... *G06K 7/1443* (2013.01); *G06K 7/1417* (2013.01)

(58) Field of Classification Search
CPC .......................... G06K 7/1443; G06K 7/1417
USPC ...................................................... 235/462.09
See application file for complete search history.

(56) References Cited

U.S. PATENT DOCUMENTS

| | | | |
|---|---|---|---|
| 10,970,507 B1 * | 4/2021 | Cornell | G06K 7/10821 |
| 2003/0150917 A1 * | 8/2003 | Tsikos | G02B 26/105 |
| | | | 235/454 |
| 2007/0080228 A1 * | 4/2007 | Knowles | G06K 7/10693 |
| | | | 235/462.42 |

FOREIGN PATENT DOCUMENTS

| | | | | |
|---|---|---|---|---|
| CA | 3057307 A1 * | 9/2018 | ....... | G06K 19/06037 |
| DE | 102016216196 A1 | 3/2018 | | |
| DE | 102016216221 A1 | 3/2018 | | |
| DE | 102019003903 A1 | 1/2020 | | |
| WO | 2018175281 A1 | 9/2018 | | |

OTHER PUBLICATIONS

International Search Report for PCT/EP2022/062911, Issued Sep. 12, 2022.

* cited by examiner

*Primary Examiner* — Michael G Lee
*Assistant Examiner* — David Tardif
(74) *Attorney, Agent, or Firm* — NORTON ROSE FULBRIGHT US LLP

(57) ABSTRACT

A two-dimensional code arrangement with at least one defined area. The defined area including basic symbols, and the basic symbols of the defined area being arranged on a surface. The basic symbols arranged in the defined area encode first code data and second code data, and the first code data comprise and/or describe position information.

11 Claims, 2 Drawing Sheets

TWO-DIMENSIONAL CODE ARRANGEMENT, POSITION DETERMINATION DEVICE, AND METHOD FOR POSITION DETERMINATION

FIELD

The present invention relates to a two-dimensional code arrangement, a position determination device and a method for position determination.

German Patent Application No. DE 10 2016 216 221 A1 describes a two-dimensional code arrangement comprising basic symbols arranged on a surface.

SUMMARY

The present invention relates to a two-dimensional code arrangement. Furthermore, the present invention relates to a position determination device and a method for position determination. Preferred and/or advantageous embodiments of the present invention are disclosed herein.

Within the scope of the present invention, a two-dimensional code arrangement is provided. The code arrangement is in particular readable and/or decodable by a sensor, specifically a sensor unit. Using the sensor unit, in particular the absolute position or relative position, in particular also the position and/or orientation, of a machine of a module or of a part can be measured and/or determined in up to six degrees of freedom. In particular, the code arrangement is designed to be detected by the sensor, in particular the sensor unit, by contactless reading, wherein a multidimensional position determination can be carried out by the contactless detection. Preferably, the two-dimensional code arrangement is used in a production, manufacturing, testing and/or automation system, in which, for example, workpieces, functional modules, devices or work equipment must be positioned.

According to an example embodiment of the present invention, the two-dimensional code arrangement comprises at least one defined area, preferably a plurality of defined areas, for example at least ten and/or a hundred defined areas. The defined areas can in particular divide a flat region evenly and/or unevenly, for example and/or preferably as a regular grid. The defined areas can have a fixed shape or different shapes, for example rectangular, hexagonal or circular.

According to an example embodiment of the present invention, the defined area and/or the defined areas in each case comprise basic symbols. The basic symbols are arranged in a planar manner in the defined area, in particular the basic symbols are arranged on a flat surface; alternatively the basic symbols are arranged on a curved or segmented surface. The basic symbols preferably form a two-dimensional grid, preferably a periodic grid. The basic symbols are preferably geometric figures, for example circles, squares, triangles or lines. Alternatively and/or additionally, the basic symbols comprise letters, symbols and/or numerals. Particularly preferably, the basic symbols present digits of a number system, for example a binary number system or a special decimal system. Specifically, the two-dimensional code arrangement comprises at least two different basic symbols, for example a symbol and a blank space as a further symbol, for example a circle and no circle or similar basic symbols of different sizes, for example large and small circles.

According to an example embodiment of the present invention, the surface for the arrangement of the basic symbols is, for example, a floor, in particular of a production, manufacturing, testing and/or automation installation. Alternatively and/or additionally, the basic symbols are arranged on the surface of a workpiece, a module, an item of work equipment or of testing equipment.

According to an example embodiment of the present invention, first and second code data are encoded by the basic symbols arranged in the defined area and/or in the defined areas, in particular in each defined area. A defined area thus contains and/or comprises first code data and second code data as information, which are encoded and/or stored by the basic symbols in the defined area. The code data preferably in each case comprise and/or describe information, data and/or parameters. The first code data comprise, encode and/or describe an item of position information. In particular, the position information is an item of information regarding the position, location and/or orientation of the defined area within the two-dimensional code arrangement and/or in a marking region on an object, for example a floor, workpiece or module. The position information takes the form of, for example, information regarding the position in two-dimensional space, for example coordinates. Alternatively, the position information takes the form of an item of three-dimensional position information. The second code data describe in particular data and/or items of information which do not represent and/or describe the position information, for example further position-independent or position-dependent information.

The present invention is based on providing a two-dimensional code arrangement which, in addition to use for localization, determination and/or setting of position and/or orientation, comprises extended functionality, making possible, in particular, a wider range of applications. For example, additional information can thus be encoded in the code arrangement for the actual localization, in particular individually for user, installation and/or task, and decoded during the operation of the installation and/or sensor unit.

According to an example embodiment of the present invention, it is particularly preferred that the second code data comprise an item of application information. The application information is, for example, information about the installation, the installation region and/or the device in which the code arrangement is applied and/or arranged. In particular, the application information can comprise and/or form a process description and/or manufacturing method description. In particular, the second code data comprise and/or describe identification information, wherein the identification information permits for example a unique identification of the corresponding code and/or defined area. For example, the identification information is an identification of the device, the installation, the region and/or the intended use of the code arrangement of the device or system. The second code data comprise and/or describe optional items of device information and/or an item of device information, for example regarding which type of device is involved and/or which data or parameters are required for start-up and/or operation of the device. Alternatively and/or additionally, the second codes describe and/or comprise data function information, for example which function the device and/or module provided with the code arrangement can provide and/or can take over.

According to an example embodiment of the present invention, it is particularly preferred that the second code data comprise an item of code arrangement information, for example where, on which object and/or at which location the two-dimensional code arrangement and/or the corresponding defined area is arranged. In particular, the second code data comprise and/or describe an item of size information, for example length and width information of the defined area, of the basic symbols and/or of the code arrangement. Alternatively and/or additionally, the second code data comprise and/or describe mapping information, for example, how much length, in particular millimeters per increment, is present and/or define an axis orientation on the basis of the defined area and/or the basic symbols. Particularly preferably, the second code data comprise and/or describe correction factors and/or a correction factor for evaluating, decoding and/or using the code arrangement as a scale.

An example embodiment of the present invention provides that the second code data describe and/or comprise an item of safety information. The safety information comprises and/or describes, for example, what hazards emanate from the object provided with the code arrangement, for example a hazard area. In particular, the safety information can describe with which further objects the object provided with the code arrangement can be combined and/or interacts and/or which objects are not in the surroundings at locations there. Particularly preferably, the second code data comprise and/or describe database information, for example an item of address information and/or link information which can be retrieved from a database or cloud information. For example, the database information permits calling upon a central database in which far more information and/or details are stored than are encoded in the actual code or the two-dimensional code arrangement. In one embodiment of the present invention, it is provided that the second code data comprise and/or describe authenticity information and/or key information. The authenticity information permits, for example, a verification and/or checking whether the present code arrangement and/or defined area is really genuine and/or is fake. Preferably, the second code data comprise and/or describe a release status, for example in order to enable the use of the code arrangement and/or an installation operation. It is particularly preferred that the second code data comprise and/or describe a model, for example a 3D model of the object provided with the code arrangement, of an installation and/or of a region. In particular, the second code data comprise and/or describe an item of link information to a database, wherein the model is preferably stored in and/or retrievable from the database.

In particular, it is provided that the two-dimensional code arrangement has a plurality of defined areas. Preferably, according to an example embodiment of the present invention, the defined areas are arranged regularly, for example as a grid. Preferably, the first code data describe and/or comprise a position, location and/or orientation of the respective defined area in the code arrangement, for example, an indication as a matrix element or a coordinate, in particular X, Y. This embodiment makes it possible to provide a larger region, for example a floor or a surface, with a plurality of defined areas and, within this area, to determine positions, location and/or orientation, and at the same time to implement additional information, the second code data.

In particular, according to an example embodiment of the present invention, it is provided that the defined area has at least a first and a second defined-area region. The first and second defined-area regions can in each case be designed to be contiguous and/or non-contiguous. In particular, the first and second defined-area regions are designed free of overlapping. In the first defined-area region, the arranged basic symbols encode and/or describe the first code data, wherein the basic symbols arranged in the second defined area serve for encoding the second code data. The first code data are thus encoded and/or comprised in the first defined-area region and the second code data in the second defined-area region. In particular, reference is made in this respect to German Patent Application Nos. DE 10 2016 216 221 A1 and DE 10 216 216 196 A1, the content of which is hereby incorporated in this application.

An example embodiment of the present invention provides that the two-dimensional code arrangement comprises first basic symbols and second basic symbols as basic symbols. In particular, the first basic symbols can be based on a first basic symbol set, and the second basic symbols can be based on a second basic symbol set. Preferably, the first basic symbols and/or the second basic symbols are of different types, for example of a different shape, color, pattern or type. For example, the first basic symbols are designed as circles, for example circles of different sizes or fill, wherein the second basic symbols form rectangles, for example. Alternatively and/or additionally, the first basic symbols are designed in a first color, for example black-and-white and/or gray shades, wherein the second basic symbols are designed in a different color, for example, multicolored and/or red-green. The first code data are in particular encoded by the first basic symbols, wherein the second basic symbols are provided for encoding the second code data. For example, the first basic symbols are arranged in the first defined-area region, wherein the second basic symbols are arranged in the second defined-area region.

One example embodiment of the present invention provides that basic symbols for encoding the first and second code data of the same type and/or of the same kind are used in the defined area, wherein, for differentiation, the basic symbols for encoding the first code data are used in a different orientation and/or size, in particular color, than those for encoding the second code data.

One example embodiment of the present invention provides that the code arrangement, in particular the arranged basic symbols, form a QR code, a dot code, a barcode or ArUco code. In particular, it can be provided that, for encoding the first code data and the second code data, in particular in the different defined-area regions, different code types are used, for example that the code arrangement in a defined area forms a mixture of QR code and dot code and/or barcode or ArUco code.

According to an example embodiment of the present invention, it is particularly preferred that the defined area and/or each defined area comprises at least one defined area symbol for specifying and/or defining a read order and/or decoding order. Preferably, the defined area symbol is arranged centrally, alternatively in the edge region or anywhere desired. In particular, it is provided that the first defined-area region comprises an X defined-area region and a Y defined-area region. Particularly preferably, Y and X defined-area regions are arranged orthogonally to one another. The X coordinate value of the defined area is encoded in the X defined-area region by the basic symbols, wherein a Y coordinate value, in particular of the defined area or of the code arrangement, is encoded in the Y defined-area region.

According to an example embodiment of the present invention, it is particularly preferred that the basic symbols arranged on the surface form a two-dimensional grid. For example, for this purpose the basic symbols are arranged equidistantly and/or in a grid-like manner.

Another object of the present invention forms a position determination device, wherein the position determination device comprises the two-dimensional code arrangement and a sensor unit. The sensor unit is designed and/or arranged to capture as an image at least one section of the code arrangement, in particular a defined area. The position determination device comprises an evaluation module, wherein the evaluation module is designed to decode the first and/or second code data on the basis of the image.

A further object of the present invention provides a method for position determination. The method provides that basic symbols are arranged on a surface, wherein the basic symbols are preferably arranged regularly and/or in grid form. The arranged basic symbols form and/or are grouped into at least one defined area. The defined area preferably comprises a known number of basic symbol places. The defined area is preferably designed to be regular and/or symmetrical, for example rectangular and/or square. Within the defined area, the arranged basic symbols encode and/or describe first code data and second code data, wherein the first code data comprise and/or describe an item of position information. The two-dimensional code arrangement, in particular the defined area, is captured by a sensor unit and an image is provided. On the basis of the image, in particular of the defined area shown, the first and second code data are decoded, wherein the position is preferably determined on the basis of the first code data in at least two, preferably in six degrees of freedom.

Further advantages, effects and embodiments of the present invention can be found in the figures and their description.

DETAILED DESCRIPTION OF EXAMPLE EMBODIMENTS

Figure 1A:
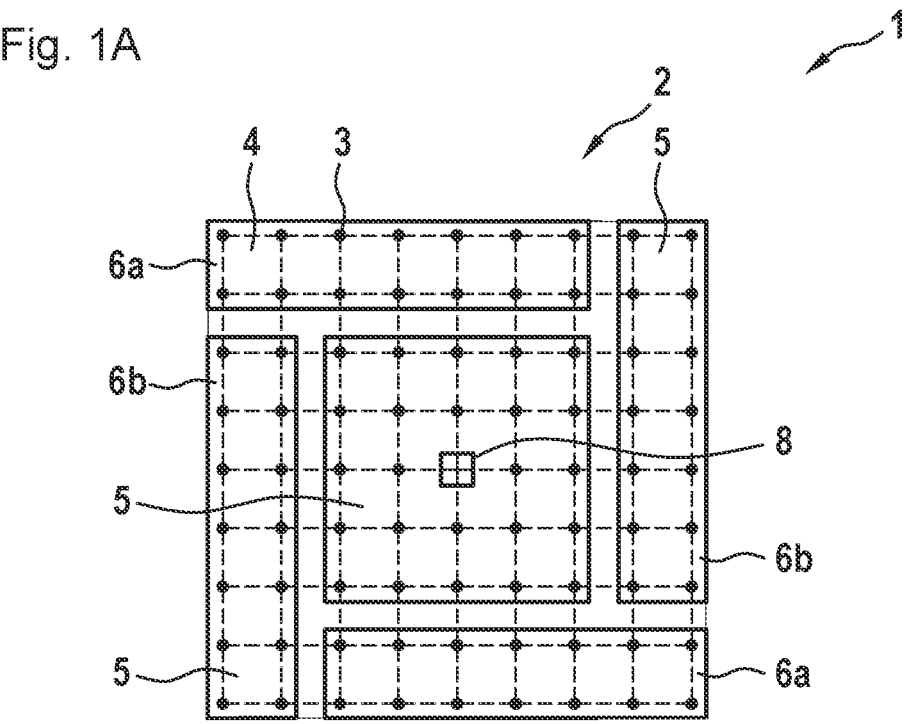
FIG. 1A and FIG. 1B show an exemplary embodiment of a defined area of a two-dimensional code arrangement, according to an example embodiment of the present invention.

FIG. 1A shows a first exemplary embodiment of a two-dimensional code arrangement. The two-dimensional code arrangement 1 is, for example, arranged on a surface, in particular a surface of an object, always for example, a system, a floor or a device. The two-dimensional code arrangement 1 comprises at least one defined area. Here, the defined area 2 takes the form of a rectangular area, in particular a square area. The defined area 2 comprises a plurality of basic symbols 3, wherein the basic symbols 3 are arranged regularly, in grid form in particular in a matrix-like manner. Here, the basic symbols 3 take the form of circles, wherein the basic symbols 3 are based, for example, on a basic symbol set which, as elements, has a circle and a non-circle or circle with radius 0, wherein this is representative of a binary number system. Alternatively, the basic symbols 3 can comprise different elements of a basic symbol set, for example circles of different sizes or different colors. The basic symbols 3 form the basis of a code and/or a number system.

The 2D code arrangement comprises a first defined-area region 4 and a second defined-area region 5. The defined-area region 4 in turn comprises two X defined-area regions 6a and two Y defined-area regions 6b. The first defined-area region 4 is designed to encode and describe an item of position information, wherein an X position and/or X-coordinate are encoded in the X-defined-area regions 6a and a Y position or Y coordinate is encoded in the Y defined-area regions 6b. For example, the position information describes a two-dimensional coordinate of the defined area 2 in the 2D code arrangement or in an absolute or relative reference system.

The second defined-area region 5 is designed for encoding and describing second code data. The second code data are in turn encoded by the basic symbols 3 in the second defined-area region 5. The second code data describe, for example, an item of scale information, of calibration information, a correction factor, object information and/or other data.

The 2D code arrangement, in particular the defined area 2, comprises a defined area symbol 8, wherein the defined area symbol 8 is arranged here in the middle and/or centrally in the defined area 2. The defined area symbol 8 here takes the form of, for example, a square. The defined area symbol 8 is designed to define and/or specify a read and/or encoded direction within the defined area 2. By means of the two-dimensional code arrangement 1, a position, location and/or orientation can take place in up to six degrees of freedom on the basis of an image capture of the defined area 2, wherein this passes in particular to the first code data or the position information, further application data or necessary data being stored and/or encoded in the second code data.

Figure 1B:
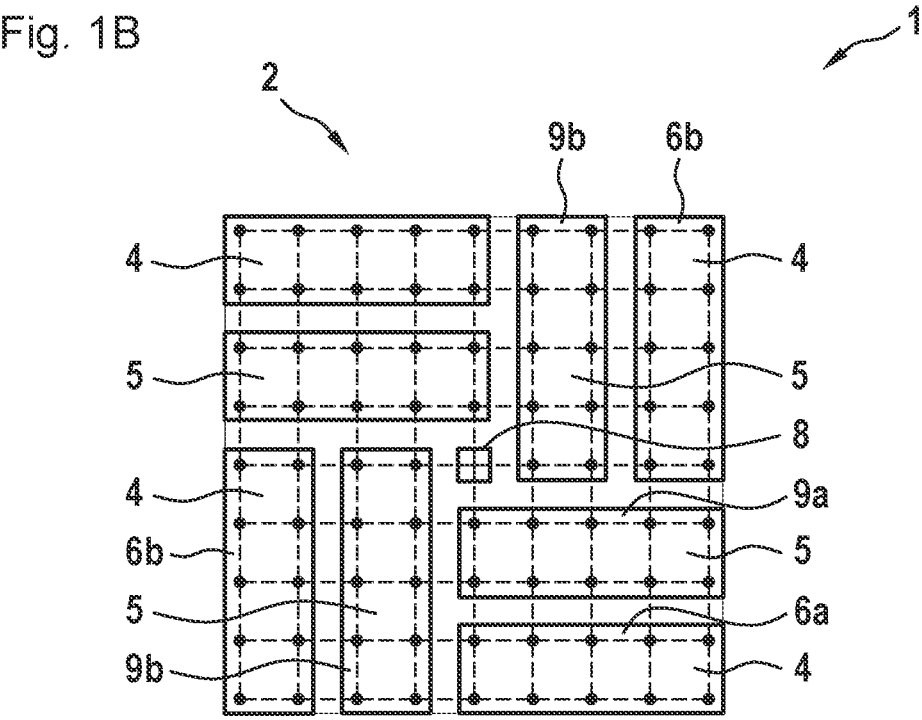

FIG. 1B shows a further embodiment of a two-dimensional code arrangement 1, wherein the two-dimensional code arrangement 1 here too comprises a defined area 2 with a plurality of defined-area regions. The defined area 2 comprises first defined-area regions 4 and second defined-area regions 5. The defined-area regions 4 and 5 here take the form of rectangular partial areas of the defined area 2. The first defined-area regions 4 are subdivided into X defined-area regions 6a and Y defined regions 6b. The second defined-area region 5 in turn comprises a plurality of second defined-area region sections 9a and 9b. The second code data are stored and/or encoded in the regions 9a and 9b, wherein in the first defined-area regions 4 the first code data, in particular the position information, is encoded. The defined area symbol 8 is again arranged centrally for defining and/or establishing a reading direction. In contrast to the exemplary embodiment in FIG. 1A, the defined area 2 is divided substantially differently into the defined areas 4 and 5.

Figure 2:
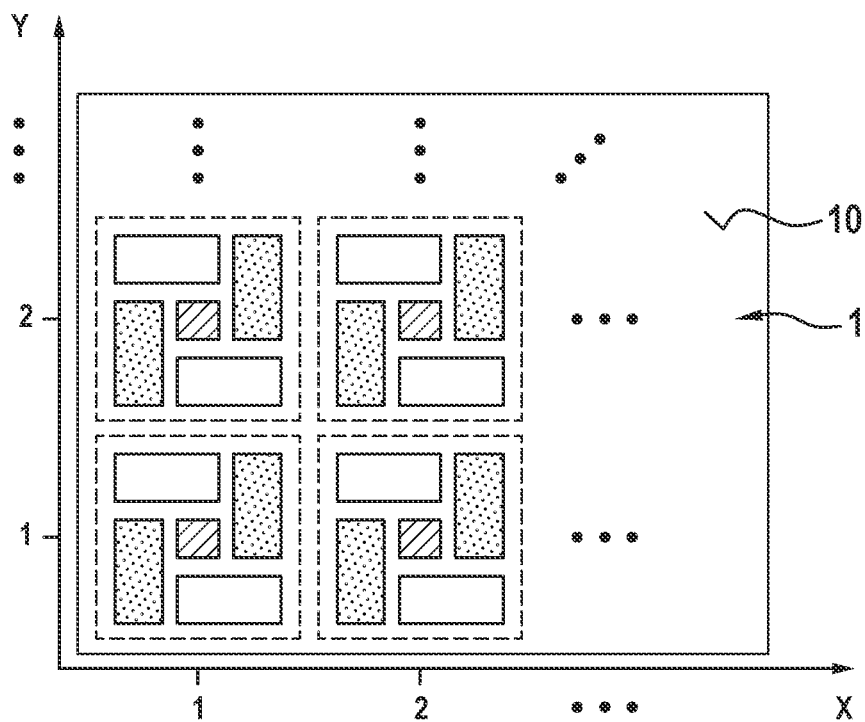
FIG. 2 shows a plurality of defined areas in a two-dimensional code arrangement, according to an example embodiment of the present invention.

FIG. 2 shows an exemplary embodiment of a two-dimensional code arrangement 1, for example with the defined areas from FIG. 1A and b. The code arrangement 1 is arranged on a surface 10, for example a floor of a manufacturing installation, wherein functional modules, for example devices and/or systems, are to be positioned on the floor, wherein the position determination and/or positioning takes place on the basis of the defined areas 2 or the two-dimensional code arrangement. For this purpose, the devices, systems and/or modules comprise, for example, a sensor unit 1. The defined areas 2 are here square in shape, wherein a plurality of defined areas 1 are arranged on the surface 10, wherein the defined areas 1 are arranged on the surface 10 regularly and/or in grid form. Each defined area 1 is designed here in the first code data to describe the respective position information of the defined area and/or to comprise this in encoded form, wherein second code data for the defined areas 1 can be designed identically or differently.

Figure 3:
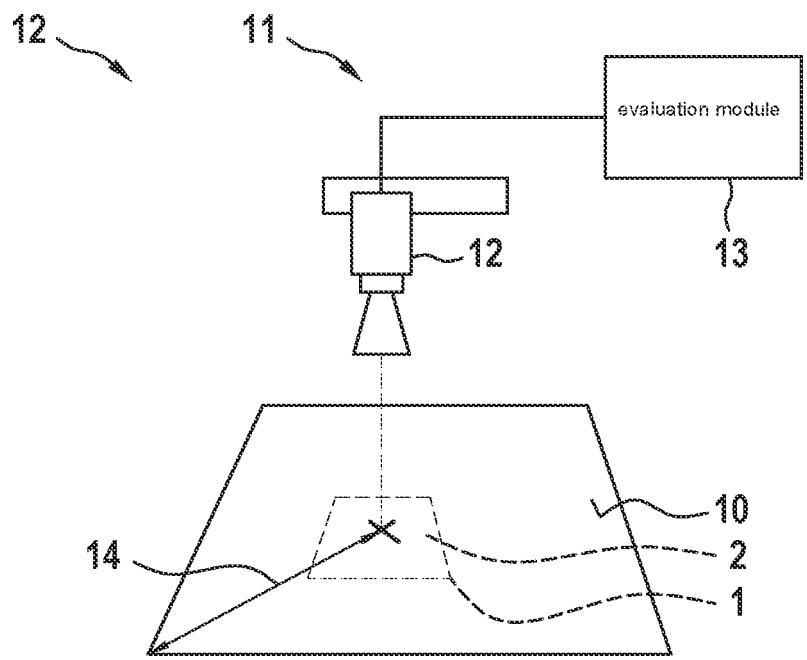
FIG. 3 shows an exemplary embodiment of a position determination device, according to an example embodiment of the present invention.

FIG. 3 shows an exemplary embodiment of a position determination device 12, wherein the position determination device 12 comprises the code arrangement 1 from FIGS. 1A and 1B, or 2. The two-dimensional code arrangement 1 is arranged on a surface 10, for example the floor of an installation. The code arrangement 1 or the defined area 2 describes in the first code data an item of position information.

The position determination device 12 comprises a sensor unit. The sensor unit 11 is designed to capture an image of the code arrangement 1, in particular of the defined area 2 or of a plurality of defined areas 2, comprising for this purpose, for example, a camera 2, wherein the camera 2, for capturing the defined area, is arranged with a viewing direction toward the floor or the surface 10. The captured image is provided to an evaluation module 13, wherein the evaluation module 13 is designed to decode, on the basis of the captured image, the two-dimensional code arrangement 1, specifically the defined area, specifically to determine the X and Y. Furthermore, the evaluation module is designed, on the basis of the captured image, in particular of the code arrangement 1 shown, in particular of the defined area 2, to determine the position, location and/or orientation of the code arrangement 1 and/or the surface 10 or of the associated object, in particular in six degrees of freedom. Furthermore, the evaluation module 13 is designed to decode the second code data on the basis of the captured image, if for example an offset and/or a calibrated parameter 14 is described herein.

The invention claimed is:

1. A position determination system, comprising:
   a two-dimensional code arrangement;
   a sensor unit; and
   an evaluation unit;
   wherein:
   the sensor unit is configured to capture an image of the two-dimensional code arrangement;
   the evaluation unit is configured to process the image of the two-dimensional code arrangement; and
   the processing of the image of the two-dimensional code arrangement includes:
   identifying a first region of the two-dimensional code arrangement as being a first predefined area dedicated to a first data category and identifying a second region of the two-dimensional code arrangement as being a second predefined area dedicated to a second data category, each of the first and second predefined areas including basic symbols arranged on a surface; and
   based on the identification:
   decoding the basic symbols arranged in the first predefined area to identify a position of a component with respect to each of six degrees of freedom in a space outside of the two-dimensional code arrangement; and
   decoding the basic symbols arranged in the second predefined area to identify data other than a positional orientation of the component in the six degrees of freedom.

2. The position determination system according to claim 1, wherein, with the decoding of the basic symbols arranged in the second predefined area, the evaluation unit identifies an item of application information, and/or identification information, and/or device information, and/or function information.

3. The position determination system according to claim 1, wherein, with the decoding of the basic symbols arranged in the second predefined area, the evaluation unit identifies size information, and/or scaling information, and/or calibration information, and/or scale information.

4. The position determination system according to claim 1, wherein, with the decoding of the basic symbols arranged in the second predefined area, the evaluation unit identifies a release status and/or an item of security information and/or database information and/or address information and/or link information and/or authenticity information item and/or key information.

5. The position determination system according to claim 1, wherein the evaluation unit is configured to process the two-dimensional code arrangement in order to identify a position and/or location and/or orientation of each of one or more of the predefined areas in the two-dimensional code arrangement.

6. The position determination system according to claim 1, wherein the basic symbols arranged in the first predefined area differ from the basic symbols arranged in the second predefined area with respect to shape.

7. The position determination system according to claim 1, wherein the basic symbols arranged in the first predefined area differ from the basic symbols arranged in the second predefined area with respect to color.

8. The position determination system according to claim 1, wherein the arranged basic symbols include and/or form a QR code and/or a dot code and/or a barcode and/or ArUco code.

9. The position determination system according to claim 1, wherein the two-dimensional code arrangement includes a third predefined area that includes at least one symbol that specifies a reading order and/or encoding order of the basic symbols in the first and/or second predefined areas, the first predefined area including an X defined region and a Y defined region, the evaluation unit being configured to identify an X coordinate value using the basic symbols in the X defined region and to identify a Y coordinate value using the basic symbols in the Y defined region.

10. The position determination system according to claim 1, wherein the basic symbols arranged on the surface form a two-dimensional periodic grid.

11. A method for component position identification using a two-dimensional code arrangement, a sensor unit, and an evaluation unit, the method comprising:
   capturing, with the sensor unit, an image of the two-dimensional code arrangement; and
   processing, by the evaluation unit, the image of the two-dimensional code arrangement, wherein the processing of the image of the two-dimensional code arrangement includes:
   identifying a first region of the two-dimensional code arrangement as being a first predefined area dedicated to a first data category and identifying a second region of the two-dimensional code arrangement as being a second predefined area dedicated to a second data category, each of the first and second predefined areas including basic symbols arranged on a surface; and
   based on the identification:
   decoding the basic symbols arranged in the first predefined area to identify a position of a component with respect to each of six degrees of freedom; and
   decoding the basic symbols arranged in the second predefined area to identify data other than a positional orientation of the component in the six degrees of freedom.

* * * * *